(12) United States Patent
Engh-Halstvedt et al.

(10) Patent No.: US 9,472,018 B2
(45) Date of Patent: Oct. 18, 2016

(54) GRAPHICS PROCESSING SYSTEMS

(75) Inventors: Andreas Engh-Halstvedt, Trondheim (NO); Jorn Nystad, Trondheim (NO); Edvard Sorgard, Hundhamaren (NO); Frode Heggelund, Trondheim (NO)

(73) Assignee: ARM LIMITED, Cambridge (GB)

( * ) Notice: Subject to any disclaimer, the term of this patent is extended or adjusted under 35 U.S.C. 154(b) by 699 days.

(21) Appl. No.: 13/111,658

(22) Filed: May 19, 2011

(65) Prior Publication Data

US 2012/0293545 A1 Nov. 22, 2012

(51) Int. Cl.
| | |
|---|---|
| G09G 5/00 | (2006.01) |
| G09G 5/02 | (2006.01) |
| G06F 13/00 | (2006.01) |
| G09G 5/36 | (2006.01) |
| G06K 9/36 | (2006.01) |
| G06K 9/54 | (2006.01) |
| G06T 15/40 | (2011.01) |
| G09G 5/393 | (2006.01) |
| G06T 11/60 | (2006.01) |
| G06T 11/00 | (2006.01) |
| G09G 5/39 | (2006.01) |
| G09G 5/14 | (2006.01) |
| G06T 3/40 | (2006.01) |
| G06F 17/30 | (2006.01) |

(52) U.S. Cl.
CPC ......... *G06T 15/40* (2013.01); *G06F 17/30265* (2013.01); *G06T 3/4038* (2013.01); *G06T 11/001* (2013.01); *G06T 11/60* (2013.01); *G09G 5/14* (2013.01); *G09G 5/39* (2013.01); *G09G 5/393* (2013.01); *G06T 2210/62* (2013.01)

(58) Field of Classification Search
CPC ... G06T 11/001; G06T 15/503; G06T 11/60; G06T 3/4038; G09G 5/02; G09G 5/14; G09G 5/39; G09G 5/393; G09G 5/363; G06F 17/30265
USPC ....... 345/629, 581, 589, 592, 619, 634, 536, 345/537, 538, 545, 556; 382/284, 305
See application file for complete search history.

(56) References Cited

U.S. PATENT DOCUMENTS

| | | | | |
|---|---|---|---|---|
| 5,949,432 | A * | 9/1999 | Gough et al. | 345/629 |
| 6,466,210 | B1 * | 10/2002 | Carlsen et al. | 345/629 |
| 6,747,665 | B1 * | 6/2004 | Stoval et al. | 345/629 |
| 6,980,224 | B2 * | 12/2005 | Wiant, Jr. | 345/629 |
| 7,176,850 | B1 * | 2/2007 | Itoh et al. | 345/9 |
| 7,355,609 | B1 * | 4/2008 | Voas et al. | 345/629 |
| 7,423,655 | B1 * | 9/2008 | Stephens | 345/624 |

(Continued)

*Primary Examiner* — Ke Xiao
*Assistant Examiner* — Andrew Shin
(74) *Attorney, Agent, or Firm* — Vierra Magen Marcus LLP

(57) ABSTRACT

In a tile-based graphics processing system, when an overlay image is to be rendered onto an existing image, the existing tile data for the existing image from the frame buffer in the main memory is pre-loaded into the local color buffer of the graphics processor (step 41). The overlay content is then rendered and used to modify the tile data stored in the color buffer (step 44). When the data for a given sampling position stored in the tile buffer is modified as a result of the overlay image, a corresponding dirty bit for the tile region that the sampling position falls within is set (step 45). Then, when all the rendering for the tile has been completed, the dirty bits are examined to determine which regions of the tile have been modified (step 46). The modified tile regions are written back to the output image in the frame buffer in the main memory (step 47), but any regions whose dirty bits have not been set are not written back to the frame buffer in the main memory.

16 Claims, 4 Drawing Sheets

(56) References Cited

U.S. PATENT DOCUMENTS

| | | | |
|---|---|---|---|
| 7,557,817 B2* | 7/2009 | Soroushi et al. | 345/634 |
| 8,144,251 B2* | 3/2012 | Huston et al. | 348/598 |
| 2003/0016235 A1* | 1/2003 | Odagawa | 345/629 |
| 2003/0103062 A1* | 6/2003 | Lee et al. | 345/629 |
| 2005/0068336 A1* | 3/2005 | Van Dyke et al. | 345/629 |
| 2006/0208960 A1* | 9/2006 | Glen | G09G 5/395 345/3.1 |
| 2008/0284798 A1* | 11/2008 | Weybrew et al. | 345/630 |
| 2009/0033670 A1* | 2/2009 | Hochmuth | G06F 3/1454 345/545 |
| 2010/0171760 A1* | 7/2010 | Itkin | 345/634 |
| 2011/0074765 A1 | 3/2011 | Oterhals | |
| 2011/0074800 A1 | 3/2011 | Stevens | |
| 2011/0080419 A1 | 4/2011 | Croxford | |
| 2011/0102446 A1 | 5/2011 | Oterhals | |
| 2013/0121569 A1* | 5/2013 | Yadav | 382/164 |

* cited by examiner

GRAPHICS PROCESSING SYSTEMS

BACKGROUND

The technology described herein relates to graphics processing systems and in particular to overlay rendering and similar operations in graphics processing systems.

As is known in the art, the output of a graphics processing system to be displayed is usually written to a so-called "frame buffer" in memory when it is ready for display. The frame buffer is then read by a display controller and output to the display (which may, e.g., be a screen or a printer) for display.

One operation that may be required of a graphics processing system is to add (render) an overlay to some existing image. In this case, the existing image will be read back in from the frame buffer (for example), modified to show the overlaid image, and then written back to the frame buffer for display.

Where this is to be done in a tile-based rendering system, tiles of data in the existing image to be overlaid will accordingly be read into the tile buffer (local memory) of the renderer, modified appropriately, and then written back out to the appropriate render output target (e.g. the frame buffer).

(As is known in the art, in tile-based rendering, the two dimensional output array of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

The writing of graphics data to and the reading of graphics data from the frame buffer (or other output buffer) consumes a relatively significant amount of power and memory bandwidth, particularly where, as is typically the case, the frame buffer resides in memory that is external to the graphics processor. Each frame can require a significant amount of data, particularly for higher resolution displays and high definition (HD) graphics.

As overlay rendering operations require reading and writing data to and from the frame buffer (or other external render target), they can accordingly consume a relatively large amount of memory bandwidth.

The Applicants believe therefore that there is scope for improvements to such operations in graphics processing systems, and in particular in tile-based graphics processing systems.

BRIEF DESCRIPTION OF THE DRAWINGS

A number of embodiments of the technology described herein will now be described by way of example only and with reference to the accompanying drawings, in which.

Like reference numerals are used for like features throughout the figures (where appropriate).

DETAILED DESCRIPTION

Figure 1:
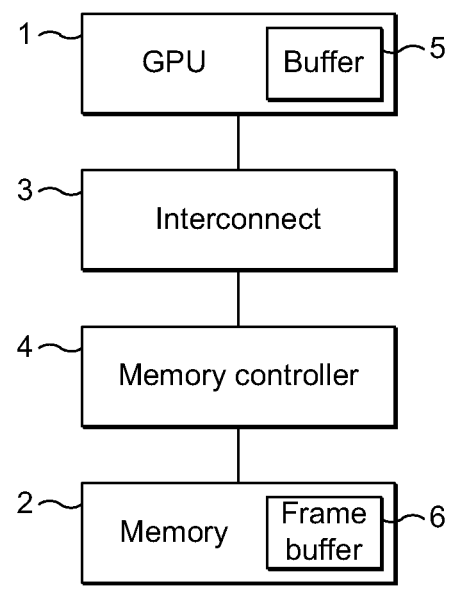
FIG. 1 shows schematically an arrangement of a graphics processing system that can be operated in accordance with the technology described herein.

A first embodiment of the technology described herein comprises a method of operating a graphics processing system when an overlay image is to be overlaid on an existing image for which data is already stored in an output array of data in an output buffer, the method comprising:

using data for the overlay image to modify data for the existing image to show the overlay image overlaid on the existing image;

determining whether there are any regions of the existing image that have not been modified when modifying the data for the existing image to show the overlay image; and for any regions of the existing image that have been determined to have not been modified when modifying the data for the existing image to show the overlay image, not writing data for those unmodified regions of the image to the output array of data in the output buffer, and leaving the existing data for those regions of the existing image unchanged in the output data array in the output buffer.

Another embodiment of the technology described herein comprises a graphics processing system comprising:

a graphics processor; and an output buffer for storing output arrays of data generated by or for use by the graphics processor; and wherein:

the graphics processing system is configured to:

when an overlay image is to be overlaid on an existing image for which data is already stored in an output array of data in the output buffer:

use data for the overlay image to modify data for the existing image to show the overlay image overlaid on the existing image;

determine whether there are any regions of the existing image that have not been modified when modifying the data for the existing image to show the overlay image; and for any regions of the existing image that have been determined to have not been modified when modifying the data for the existing image to show the overlay image, not write data for those unmodified regions of the image to the output array of data in the output buffer, and leave the existing data for those regions of the existing image unchanged in the output data array in the output buffer.

The technology described herein relates in these embodiments to the generation of overlaid images in a graphics processing system. In the technology described herein, when an existing image (e.g. an image that has been previously generated) is modified to show an overlaid image, rather than the modified image then being written back to the output data array (which could be, e.g., and in one embodiment is, the frame buffer) in its entirety, it is determined whether any regions of the image have in fact not been modified (i.e. are unchanged from their existing state in the output buffer), and any such unmodified regions of the image are then not written back to the output data array.

This has the effect of not writing to the output data array, regions of an image that are not in fact modified when the overlay image is overlaid on the existing image, thereby avoiding write operations in respect of those regions of the overlaid image.

The Applicants have recognised that in a situation where an overlay image is to be overlaid on an existing image in a graphics processing system, there may be regions of the existing image that are not in fact modified by the overlay image, and that, moreover, such regions do not need writing back to the output data array in the output buffer (e.g. frame buffer), as the data already existing in the output buffer for those regions can still validly be used for the modified (overlaid) image.

The technology described herein exploits this recognition, by identifying regions in the image that have not been modified when applying the overlay image, and then not writing such regions back to the output buffer. In other words, the technology described herein determines whether the data for regions of an image needs to be written back to the output buffer or not, following the image modification process (and acts accordingly based on the determination). This has the effect that output buffer write operations for unmodified regions of an overlaid image can be avoided, thereby reducing the memory bandwidth, and, e.g., power, consumption related to and used by the writeback process following the image's modification. As discussed above, the memory bandwidth, etc., burden relating to the writeback process can be relatively high, so by reducing this, the technology described herein can save, e.g., time and energy, relative to schemes that always write an overlaid image back to the output buffer in its entirety.

The existing image (the image that the overlay is to be applied to) can comprise any suitable and desired output array of data that a graphics processing system can handle and apply an overlay to. In one embodiment it comprises an output frame for display, but it may also or instead comprise other outputs of or for a graphics processor, such as a graphics texture (where, e.g., the render "target" is a texture that the graphics processor is being used to generate (e.g. in "render to texture" operation)), or other surface to which the output of the graphics processor system is to be written.

The existing image (array of data) may be, and in one embodiment is, an image (array) that has previously been generated by the graphics processing system itself. However, it could also or instead be an image (an array of data) from another source, such as a frame of video generated by a separate video decoder. (In this case, the overlay could, e.g., be media player controls to be displayed on top of a video generated by a separate dedicated video decoder.)

Similarly, the output buffer that the existing image data is stored in, and that the modified image data is to be written to, may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well. In an embodiment it is stored in main memory of the system that incorporates the graphics processor. In one embodiment the output buffer is a frame buffer for the graphics processing system and/or for the display that the graphics processing system's output is to be provided to.

Although the technology described herein can be used in any suitable graphics processing system, as discussed above the technology described herein is particularly applicable to tile-based graphics processing systems, in which the rendering output (such as, e.g., a frame to be displayed) is divided into plural rendering tiles for rendering purposes (is processed on a tile-by-tile basis). Thus, in an embodiment, the graphics processing system is a tile-based graphics processing system.

Where the technology described herein is being used in a tile-based graphics processing system, then in an embodiment, the image overlay (modification) process is carried out on a tile-by-tile basis, i.e. by processing tiles of the image in turn in the manner of the technology described herein.

Thus, in an embodiment the technology described herein comprises a method of operating a tile-based graphics processing system when an overlay image is to be overlaid on a tile for an existing image for which data is already stored in an output array of data in an output buffer, the method comprising:

using data for the overlay image to modify data for the tile for the existing image to show the overlay image overlaid on the existing image;

determining whether there are any regions of the tile that have not been modified when modifying the data for the tile to show the overlaid image; and for any regions of the tile that have been determined to have not been modified when modifying the data for the tile to show the overlaid image, not writing data for those unmodified regions of the tile to the output array of data in the output buffer, and leaving the existing data for those regions of the tile unchanged in the output data array in the output buffer.

Similarly, in an embodiment, the technology described herein comprises a graphics processing system comprising:

a tile-based graphics processor; and an output buffer for storing output arrays of data generated by or for use by the graphics processor; and wherein the graphics processing system is configured to, when an overlay image is to be overlaid on a tile for an existing image for which data is already stored in an output array of data in the output buffer:

use data for the overlay image to modify data for the tile for the existing image to show the overlay image overlaid on the existing image;

determine whether there are any regions of the tile that have not been modified when modifying the data for the tile to show the overlaid image; and for any regions of the tile that have been determined to have not been modified when modifying the data for the tile to show the overlaid image, not write data for those unmodified regions of the tile to the output array of data in the output buffer, and leave the existing data for those regions of the tile unchanged in the output data array in the output buffer.

As will be appreciated by those skilled in the art, these embodiments of the technology described herein can include any one or more or all of the preferred and optional features of the technology described herein that are described herein, as appropriate.

In these embodiments of the technology described herein, the tiles that the render output (image) is divided into for rendering purposes can be any suitable and desired such tiles. The size and shape of the rendering tiles will, as is known in the art, normally be dictated by the tile configuration that the graphics processor is configured to use and handle.

The rendering tiles are in an embodiment all the same size and shape (i.e. regularly-sized and shaped tiles are used), as is known in the art, although this is not essential. In an embodiment, the tiles are square or rectangular. The size and number of tiles can be selected as desired. In one arrangement, each tile is 16×16 or 32×32 sampling positions in size (with the image (render output) then being divided into however many such tiles as are required for the image (render output) size and shape that is being used).

The data for the overlay image (the image to be overlaid on the existing image) can be provided in any desired and suitable manner. In one embodiment, this data is generated by the graphics processing system rendering an appropriate image to be applied to the existing image. Thus, in one embodiment, the technology described herein includes a step of generating data for the overlay image (which generated data is then used to modify data for the existing image), and the graphics processing system is configured to generate data for the overlay image.

However, other arrangements would be possible. For example, the overlay image could have been pre-generated by a different processor, and, e.g., then provided to the graphics processing system for use (e.g. by storing it in an appropriate memory), rather than it having to be rendered by the graphics processing system itself. This could be the case, e.g., for a channel overlay to be shown over a TV channel.

The data for the overlay image can be used in any desired and suitable manner to modify the data for the existing image to show the overlaid image. In an embodiment, this is done, as is known in the art, by blending the data for the overlay image with the existing image data appropriately. (Other arrangements would, of course, be possible.)

The presence (or otherwise) of regions of the image that have not been modified can be determined in any desired and suitable manner. In an embodiment, this is done by means of meta-data associated with particular regions of the image. Thus, in an embodiment meta-data associated with respective regions (e.g. sampling positions) of the image is used to determine whether the data for respective, particular regions of the image needs to be written back to the output data array in the output buffer or not.

Thus, in an embodiment, the image (e.g., each rendering tile for the image, in a tile-based system) is divided into plural regions, with each region having associated with it meta-data that can be used to determine whether that region of the image has been modified or not. In an embodiment, the meta-data indicates whether the region of the image (e.g. region of the tile) has been modified or not.

The "modification" meta-data may take any suitable and desired form, but in an embodiment is in the form of a "modified" or "dirty" bit or bits (a "modified" or "dirty" flag) associated with the region in question and which can be set to indicate whether the region has been modified or not.

The regions that the image (e.g. that a rendering tile for the image) is divided into for this purpose be of any suitable and desired size and form. Thus, the image regions can each represent any suitable and desired region (area) of the image. So long as the image is divided or partitioned into a plurality of identifiable smaller regions each representing a part of the image, then the sub-division of the image into regions can be done as desired.

In an embodiment, each image region that is considered represents a different part (sub-region) of the image (although the regions could overlap if desired). Each region should represent an appropriate portion (area) of the image, such as a plurality of data positions within the image (e.g., within a tile for the image in a tile-based graphics processing system).

In one embodiment, the image (the output array of data) is divided into regularly sized and shaped regions, in an embodiment in the form of squares or rectangles. However, this is not essential and other arrangements could be used if desired.

In one embodiment, each individual data entry (sampling) position in the image is considered individually. In this case, each region of the image that is considered will be a single sampling position for the image (e.g. the tile of the image) (and thus, e.g., each sampling position will have a corresponding dirty bit associated with it).

It would also be possible to consider groups of data entries (groups of sampling positions) for the image (e.g. in a tile) collectively, i.e. for the regions that are considered (and that, e.g., have respective meta-data (e.g. dirty bits) associated with them) to comprise groups of sampling positions, such as 2×2, 4×4 or 8×8 groups of sampling positions for the image (e.g. within the tiles), and in another embodiment, this is what is done. This may particularly be appropriate, e.g., where the rendered image is downsampled when it is output to the output buffer, as each image region could then correspond to a given data entry (e.g. pixel position) in the output buffer. Thus, in an embodiment, a region or the regions of the image being processed (e.g. of a tile for the image) that is or are considered each comprise a set of sampling positions (data entries) for the image that collectively contribute to a single data entry (pixel position) in the output data array for the image.

In an embodiment of these arrangements where meta-data is used to indicate whether a region for the image has been modified or not, then the image data modification process (the overlaid image rendering process) modifies the meta-data associated with the corresponding region of the image if it modifies that region of the image, and the meta-data is, in an embodiment, then used to determine which regions of the image have been modified and therefore should be written back to the output data array. In other words, any existing image regions whose data is modified using the overlay image (e.g. because they are covered by part of the overlay image that will be seen in the final image) have their meta-data set accordingly, and then as rendering of the modified image is completed, the meta-data is examined and used to determine whether and which image regions need to be written back to the output data array in the output buffer.

The meta-data may be arranged and implemented in use as desired. For example, an array of meta-data (dirty bits) corresponding to the image or part of the image (e.g. tile) being processed could be maintained, and then every time the rendering operation writes to a sampling position, the corresponding meta-data entry (dirty bit) in the array set to indicate that. In an embodiment, this is what is done. Other arrangements would, of course, be possible.

It is believed that arrangements that set and use meta-data to determine the regions of a modified image that should be written back to an output data array may be new and advantageous in their own right.

Thus, an embodiment of the technology described herein comprises a method of operating a graphics processing system when an overlay image is to be overlaid on an existing image for which data is already stored in an output array of data in an output buffer, the method comprising:

using data for the overlay image to modify data for the existing image to show the overlaid image;

recording in meta-data associated with the image those regions of the image that have been modified when modifying the data for the existing image to show the overlaid image; and using the meta-data to determine for at least one region of the image, whether to write new data for the region of the image to the output array of data in the output buffer, or to leave the existing data for the region of the image unchanged in the output data array in the output buffer.

Similarly, an embodiment of the technology described herein comprises a graphics processing system, comprising:

a graphics processor configured to generate data to form an output array of data to be provided by the graphics processor; and wherein the graphics processing system is configured to, when an overlay image is to be overlaid on an existing image for which data is already stored in an output array of data in an output buffer:

use data for the overlay image to modify data for the existing image to show the overlaid image;

record in meta-data associated with the image those regions of the image that have been modified when modifying the data for the existing image to show the overlaid image; and use the meta-data to determine for at least one region of the image, whether to write new data for the region of the image to the output array of data in the output buffer, or to leave the existing data for the region of the image unchanged in the output data array in the output buffer.

An embodiment of the technology described herein comprises a graphics processor configured to, when an overlay image is to be overlaid on an existing image for which data is already stored in an output array of data in an output buffer:

use data for the overlay image to modify data for the existing image to show the overlaid image;

record in meta-data associated with the image those regions of the image that have been modified when modifying the data for the existing image to show the overlaid image; and use the meta-data to determine for at least one region of the image whether to write new data for the region of the image to the output array of data in the output buffer, or to leave the existing data for the region of the image unchanged in the output data array in the output buffer.

As will be appreciated by those skilled in the art, these embodiments of the technology described herein can include any one or more or all of the preferred and optional features of the technology described herein that are described herein, as appropriate. Thus, for example, the meta-data may be in the form of a "dirty" or "modified" flag that is associated with a respective image region, the image regions that are considered (and that each have respective meta-data associated with them) may comprise image regions that correspond to a pixel in the output data array, etc.

Similarly, the graphics processing system and/or the graphics processor may be a tile-based system and/or processor, and the image may be processed on a tile-by-tile basis, i.e. by processing tiles for the image, and using the meta-data to indicate whether regions of a tile have been modified or not, etc.

As will be appreciated from the above, although the technology described herein does not write any regions of an image (e.g. of a tile) that have been determined not to have been modified back to the output data array once the image has been modified, any modified regions of the image will need to be, and are, written back to the output data array in the output buffer. This writing back of the modified regions of an image can be done in any suitable and desired manner, e.g. that is appropriate to the memory system and mechanisms for the graphics processing system in question.

In an embodiment, the image data (e.g. tile) writeback process for writing back the modified image regions is tailored for, and takes account of, the particular output buffer (e.g. main memory) write mechanisms and processes that the graphics processing system uses and/or supports.

For example, in a typical graphics processing system, data will be written to an output buffer in main memory in several bursts, with each burst containing several data "transfers". For example, considering a 16×16 sampling position tile, with 16 bits of data per sampling position, this gives a total of 16×16×16=4096 bits of information for writing the tile to main memory. If the graphics processor is coupled to a 64-bit memory bus with a maximum burst length of 8 transfers per burst, then to write out the whole tile data would require 4096/64=64 transfers, organized optimally as 8 bursts of 8 transfers each.

Where such a data writing mechanism is used, then it is, as discussed above, in an embodiment tailored to take account of the fact that when using the technology described herein some image (e.g. tile) regions may not need to be written back to the output buffer at all.

Thus, for example, if none of the data in a burst has been modified, then the burst as a whole can be, and in an embodiment, is omitted. This saves time and bus bandwidth.

Similarly, if whole transfers at the beginning or end of a burst are unmodified, then these transfers can be, and in an embodiment are, omitted and a shorter burst created that covers only the modified data transfers. This also saves time and bus bandwidth.

If transfers within a burst, or only part of the data within a transfer, are modified, then the data strobe lines can be, and in an embodiment are, activated individually for each transfer, disabling writing of parts of the data. In the above example, where there would be four 16-bit sampling positions in each 64-bit transfer, then for a transfer where half the sampling positions are modified, then only half the write strobe signals would be asserted for that transfer. The data pins associated with the de-asserted strobes need not be actively driven, and can either remain at their previous values or be switched into a high-impedance state. Although this does not in itself save time or bus bandwidth, it may save power (depending on the memory system design) by not having to drive the de-asserted data pins.

It will be appreciated that the modification of the existing image to show the overlaid image may require data for the existing image that is in the output data array, for example where the overlay image data is to be blended appropriately with the existing image data to show the overlaid image.

Where existing image data in the output data array is needed for the modification process, then that data can be provided and used in any suitable and desired manner. However in an embodiment, any existing image data in the output data array that is needed for the modification process is read back into a local memory (e.g., a tile buffer) of the rendering processor (the graphics processor) from the output buffer. This then allows the modification process to be carried out using normal graphics processor (rendering) operations, i.e. by using the overlay image to modify, as appropriate, existing data in a local, e.g., tile, buffer of the graphics processor.

In this arrangement, the image data in the output data array may be scaled-up to provide the array of data for the local buffer, if desired and as required. This may be needed where, for example, the data from the graphics processor is downsampled before it is written to the output, e.g. frame, buffer (and the original, pre-downsampling data is not otherwise available) (such that when reading the data back in from the output buffer, the downsampling will need to be "reversed").

If the local memory of the graphics processor is large enough, then the existing image could be read back into the local memory of the graphics processor in its entirety for the modification process. However, in an embodiment, the existing image is read back into the local memory of the graphics processor in parts, each part representing a particular region of the existing image, with each such part being processed and returned to the output buffer before another part is loaded and so on. This avoids the need to load the entire existing image into a local memory of the graphics processor at the same time.

In an embodiment, the parts of the existing image that are processed and loaded in this manner correspond to rendering tiles of the image. Thus, in an embodiment, the existing image is processed on a rendering tile by rendering tile basis, i.e. the image is processed by modifying individual rendering tiles for the image in turn.

In one embodiment of these arrangements, the part of the existing image (which may correspond to, and comprise, as discussed above, a tile of the image) which is being processed at a given time is read back into the local memory (which may be, and in an embodiment is, a tile buffer) of or available to the graphics processor (the rendering processor) from the output buffer in its entirety, before applying the overlay image to the image part (e.g. tile). In this embodiment therefore, the technology described herein will comprise first reading a part of the existing image (e.g., a tile for the existing image) to be modified back into a local buffer of the graphics processor from the output data array in the output buffer, modifying the read-in image part (e.g. tile) to include the overlay image, determining if any regions of the read-in image part (e.g. tile) have not been modified, and writing the image (e.g. tile) data back to the output data array in the output buffer from the local memory accordingly.

In such an embodiment where the entirety of the data for an, e.g. tile, is read back in from the output buffer before applying the modification (the overlay image), then where meta-data is used to indicate whether regions of the image (e.g. in this case of the image part, e.g. tile) have been modified or not, the "modification" meta-data for the image part (e.g. tile) could, e.g., be "cleared" when the image data (e.g. tile) is read in (thereby indicating that the image data is, as yet, unchanged), and then the meta-data for any image part (e.g. tile) regions modified by the rendering process set to indicate that as the rendering process proceeds.

However, the Applicants have further recognised that where, e.g., a region of a tile will not be modified, then it would not actually be necessary to read the data for that region of the tile back into the local buffer from the output buffer for the modification process. If such read operations were then not performed, that would provide further memory bandwidth, etc., savings, as it would reduce the number of output buffer (main memory) read operations required for the modification (overlay) process. Such an arrangement would then reduce not only the number of writes required to write the modified image back to the output buffer (e.g. main memory), but also the number of reads required to preload the local memory (e.g. tile buffer) with the existing image data.

Thus, in an embodiment, it is determined whether there is any data from the existing image (e.g., and in an embodiment, from a part, such as a tile, of the image) that is not required for the modification process, and where such data is identified, that data is not read back into the local buffer of the rendering processor from the output buffer as part of the modification process. Such data may be identified by considering appropriate regions of the image or part of the image (e.g. tile) in a similar manner to that discussed above for the post-modification writeback process (which regions of the image (e.g. of the tile) are accordingly in an embodiment configured as discussed above for the post-modification writeback process). Thus, in an embodiment, only selected regions of an existing image in the output data array (e.g. in a part, such as a tile, of the output data array) in the output buffer are read and loaded for the modification (overlay) process (and only some but not all of the data for an existing image in the output data array (e.g. for a part, e.g. tile, of the output data array) in the output buffer is read and loaded for the modification process).

Existing image data that is not required for the modification process can be determined in any suitable and desired manner. In an embodiment, this is done by identifying existing image data that will or could be needed for the modification process, and then loading that existing image data from the output buffer to the local memory for the modification process, but not loading any existing image data that has not been identified as being data that will or could be needed for the modification process (and hence is thereby determined to be existing image data that is not needed for the modification operation).

It would be possible to try to identify the existing image data that will (or will not) be needed for the modification operation in advance (i.e. before the modification process is begun) and to then load the appropriate existing image data from the output buffer at that stage.

However, in an embodiment, the loading of the existing image data from the output buffer is deferred until it is determined during the modification (rendering) process that it will or could actually be needed (at which point it is then loaded), rather than loading it in advance before the modification process (the overlaid image rendering) starts.

In an embodiment, as the modification process (overlaid image rendering) is being performed, when a region of the image is found to be modified as a result of the process (i.e. data is generated for that region by the modification operation (the data for the overlay image includes data for that image region)), then at that point the existing image data in the output buffer for the region of the image is loaded from the output buffer for use in the modification process.

It is believed that such an arrangement where the need to load existing image data is determined "on-the-fly", as the overlay modification process proceeds is particularly advantageous, as it allows the overlay process to be carried out in a more efficient manner. Indeed, it is believed that such arrangements may be new and advantageous in their own right. Thus, the technology described herein also extends to this process.

An embodiment of the technology described herein comprises a method of operating a graphics processing system when an overlay image is to be overlaid on an existing image for which data is already stored in an output array of data in an output buffer, the method comprising:

as the overlaid image is rendered, loading any existing image data in the output data array that is needed for the overlay rendering process back into a local memory of the graphics processing system from the output buffer for modification using data for the overlay image to show the overlay image overlaid on the existing image; and writing the modified data showing the overlaid image back to the output array of data in the output data array; wherein:

the step of loading existing image data in the output data array that is needed for the overlay rendering process back into a local memory of the graphics processing system from the output buffer for modification using data for the overlay image to show the overlay image overlaid on the existing image comprises:

identifying regions of the existing image that will be modified using data for the overlay image as the overlaid image is rendered; and selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered.

Similarly, an embodiment of the technology described herein comprises a graphics processing system comprising:

a graphics processor;

a local memory of or available to the graphics processor; and an output buffer for storing output arrays of data generated by or for use by the graphics processor; and wherein:

the graphics processing system is configured to:

when an overlay image is to be overlaid on an existing image for which data is already stored in an output array of data in the output buffer:

as the overlaid image is rendered, load any existing image data in the output data array that is needed for the overlay rendering process back into the local memory of or available to the graphics processor from the output buffer for modification using data for the overlay image to show the overlay image overlaid on the existing image; and write the modified data showing the overlaid image back to the output array of data in the output data array; wherein:

the graphics processing system is further configured such that the process of loading existing image data in the output data array that is needed for the overlay rendering process back into the local memory of or available to the graphics processor from the output buffer for modification using data for the overlay image to show the overlay image overlaid on the existing image comprises:

identifying regions of the existing image that will be modified using data for the overlay image as the overlaid image is rendered; and selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered.

As will be appreciated by those skilled in the art, these embodiments of the technology described herein can include any one or more or all of the preferred and optional features of the technology described herein that are described herein, as appropriate. Thus, for example, in an embodiment the overlay rendering process processes a tile of the image at a time, and in an embodiment, no existing image data is loaded from the output buffer before the modification operation (the rendering of the image to be overlaid) starts (then as the overlaid image is rendered, regions of the image that will be modified are identified, and existing image data loaded from the output buffer for the modification operation on the basis of the regions of the image that have been identified as to be modified). Similarly, in an embodiment the process further comprises determining whether to write data for the overlaid image back to the output buffer in the manner discussed above.

In an arrangement of these embodiments of the technology described herein, the process further comprises determining whether, even if the region of the image has been found to be modified (i.e. new data has been generated for it when generating the overlaid image), the existing image data is actually needed for the modification process (and then only loading the existing image data in that event).

The Applicants have recognised that even where the image data is to be modified, such modification may not always require the existing image data, for example where the new image data does not depend on (e.g. will simply overwrite) the existing image data. In such situations, the existing image data is not required for the modification operation, and so need not be loaded, and so by identifying such situations, a further reduction in the amount of loading of the existing image data can be facilitated.

(On the other hand, if the new image data does depend on the existing image data, such as may be the case where the image is semi-transparent or at an anti-aliased edge, then the existing image data will need to be loaded from the output buffer before the new (modified) image data can be calculated.)

Thus, in an embodiment, even where it is identified that the image data will be modified, it is then considered whether the modification operation requires the existing image data for the region of the image (e.g. the region of the tile for the image) in question (based, e.g., on the transparency of the image region, whether the image region lies at or near an edge in the image, whether the modification affects a partially covered pixel, etc.).

Where it is determined that data for a region of the existing image will need to be loaded for the modification operation, then the system could, e.g., simply load the data for the image region in question and nothing else. However, the Applicants have recognised that, e.g. depending on the details of the memory system, it may be more efficient to load more data than is definitely required at one time (e.g. to fetch multiple regions of data at one time), and thus in an embodiment, this can be, and is, done. For example, it may be more efficient to fetch data in bursts, and any additional overhead for loading additional data may be lower than if separate requests were used for each image region. Also, if semi-transparent rendering is being used, adjacent image regions are likely to be treated similarly, so loading more existing image data can usefully act as a speculative fetch for existing image data that is likely to be required soon in any event.

In these arrangements, the image (e.g. tile) regions for which the existing image data in the output buffer has been read and loaded may be marked immediately as having been modified ("dirty"). However, in an embodiment, image (e.g. tile) regions for which the existing image data in the output buffer has been read and loaded are marked as unmodified ("clean"), until such time as they are positively modified by the overlay image. This will avoid unnecessarily writing back existing image data that although read into the local buffer is not in fact modified.

Thus, in one embodiment, no existing image data is loaded from the output buffer before the modification operation (the rendering of the image to be overlaid) starts, then as the overlaid image is rendered, regions of the image that have been modified are determined, and existing image data loaded from the output buffer for the modification operation on the basis of the regions of the image that have been determined to be modified.

As discussed above, in an embodiment, even if an image region has been found to be modified, it is then determined whether the existing image data for that image region is actually required or not.

Thus, in an embodiment, the existing image data that is loaded from the output buffer for the modification process is selected on the basis of whether it is needed for the modification operation or not (and any "unselected" existing image data is not loaded from the output buffer for the modification operation). In an embodiment, the selection of the existing image data to load is based, as discussed above, on the regions of the image that are determined to be modified by the modification operation, and in an embodiment, on whether for any given modified region of the image, the existing image data is actually needed for the modification operation. The effect of this then is that, in practice, typically some but not all of the existing image data will be loaded from the output buffer for the modification process (i.e. in essence at least the existing image data for those image regions where the existing image data is needed for the modification operation will be loaded, but not existing image data for one or more image regions that will not be modified by the modification operation, and/or for which the existing image data is not needed for the modification operation).

The use of an arrangement in which both the reading and loading of existing image data and the writing back of modified image data to the output buffer is controlled in this manner is particularly advantageous. In particular, the Applicants have recognised that in typical overlaid scenes, large areas will either be opaque objects, and therefore not require reading and loading of existing image data, or untouched transparent areas, thereby eliminating both reading and loading of the existing image data and the writing back of any modified image data. Thus the technology described herein, in these arrangements at least, makes it possible to potentially eliminate a majority of existing image data read accesses, and a good proportion of the image data writeback operations, for typical overlaid content.

Where it is known, e.g., that image data has been modified and the existing image data is not required, then the existing image data loading (reading) operation could be, and in an embodiment is, modified as discussed above in relation to the image data writeback operation, for example to modify the burst length and/or strobe bits, appropriately (and where possible), to take account of this. (In this case, the strobe signals should be asserted for the unmodified image regions, not the modified ("dirty") ones.)

In arrangements of the technology described herein where meta-data is used, as discussed above, to indicate whether an image region (e.g. a region of a tile of the image) has been modified or not, then in one embodiment of this existing image (e.g. tile) data loading process, when a part of an image, such as a tile for the image, is to be processed, the meta-data for the image part (e.g. tile) is initially set to indicate that all the image data is unmodified (e.g. all the dirty bits are initially cleared) and the existing image data is not loaded from the output buffer at this stage (such that the local memory (e.g. tile buffer) will be in an undefined state).

Then, if an image region is to be modified as a result of the new (overlay) image rendering, the existing image data for that region (at least) is loaded (in an embodiment subject to determining that the existing image data will actually be needed for the modification operation), the new image data for the region is determined (using the existing image data where required), the meta-data for the image region is set to the "modified" state (e.g. the dirty bit is "set"), and the meta-data is used to control the writing back of the image data to the output data array in the output buffer (as discussed above). In this case, additional meta-data could be used to keep track of which existing image regions' data has been loaded, if desired and if required.

It would also be possible to immediately mark any image (e.g. tile) regions for which the existing image data in the output buffer has been read and loaded as being modified ("dirty"). (In this case, there could be a risk that speculatively loaded existing image data which is not in fact modified is then written back to the output buffer, but the Applicants believe that this will still provide acceptable performance.)

As discussed above, the technology described herein is particularly applicable for use in tile-based graphics processing systems, and in that case, the output data array (e.g. image) is in an embodiment processed on a tile-by-tile basis, i.e. by rendering the image and applying the overlay, a tile at a time. Thus, the above processes should be carried out for a single rendering tile for the image (output data array), and then repeated for each further tile making up the image (output data array) that is to be modified (or at least for each tile of the image that could be subject to modification, where the system is able to identify that (e.g. is able to identify tiles that for certain won't be modified)).

The modification determination process, and meta-data generation, where used, etc., may be implemented in an integral part of the graphics processor, and in an embodiment this is what is done. However, there could also or instead be, e.g., a separate "hardware element" that is intermediate the graphics processor and the output (e.g. frame) buffer that does this, if desired.

In one embodiment, there is a hardware element that carries out the write-back (and read-in) process and controls the writing and reading (or not) of the data to and from the output buffer. In one embodiment, this hardware element is separate to the graphics processor, and in another embodiment it is integrated in (part of) the graphics processor.

The technology described herein can be used irrespective of the nature or purpose of the overlaid image. Thus, for example, it may be used where the tiles and the output image are intended to form an image for display (e.g. on a screen or printer) (and in one embodiment this is the case). However, the technology described herein may also be used where the output overlaid image is not intended directly for display, but is some other form of output data array that the graphics processor is able to generate, such as, for example, a texture that the graphics processor is being used to generate (e.g. in "render to texture" operation), or, indeed, where the output the graphics processor is being used to generate is any other form of data array.

The technology described herein may also be used with other processes and techniques for controlling the reading and writing of image data from and to an output buffer in a graphics processing system, as appropriate and if desired.

Similarly, although the technology described herein has been described above with particular reference to graphics processor operation, the Applicants have recognised that certain aspects of the technology described herein may also be advantageously applied to other systems that use a local memory buffer for read-modify-write operations on data in main memory in a similar manner to, e.g., tile-based graphics processing systems, such as a general purpose read/write cache in a CPU.

Thus, an embodiment of the technology described herein comprises a method of operating a data processing system when new data is to be used to modify an existing set of data which is already stored in an output buffer, to generate a modified set of data, the method comprising:

as the modified set of data is generated, loading any existing data in the output buffer that is needed to generate the modified set of data into a local memory for the data processing system from the output buffer for modification using the new data to generate the modified set of data; and writing the modified data back to the output buffer; wherein:

the step of loading existing data in the output buffer that is needed to generate the modified set of data into the local memory for the data processing system from the output buffer for modification using the new data to generate the modified set of data comprises:

identifying parts of the existing set of data that will be modified using the new data as the modified set of data is generated; and selecting the existing data that is loaded from the output buffer into the local memory for the data processing system for generating the modified set of data on the basis of the parts of the existing set of data that have been identified as being parts of the existing set of data that will be modified using the new data as the modified set of data is generated.

Similarly, an embodiment of the technology described herein comprises a data processing system comprising:

a data processor;

a local memory for the data processor; and an output buffer for storing output sets of data; and wherein:

the data processing system is configured to, when new data is to be used to modify an existing set of data which is already stored in the output buffer to generate a modified set of data:

as the modified set of data is generated, load any existing data in the output buffer that is needed to generate the modified set of data into the local memory for the data processing system from the output buffer for modification using the new data to generate the modified set of data; and write the modified data back to the output buffer; wherein:

the data processing system is further configured such that the process of loading existing data in the output buffer that is needed to generate the modified set into the local memory for the data processing system from the output buffer for modification using the new data to generate the modified set of data comprises:

identifying parts of the existing set of data that will be modified using the new data as the modified set of data is generated; and selecting the existing data that is loaded from the output buffer into the local memory for the data processing system for generating the modified set of data on the basis of the parts of the existing set of data that have been identified as being parts of the existing set of data that will be modified using the new data as the modified set of data is generated.

As will be appreciated by those skilled in the art, these embodiments of the technology described herein can, and in an embodiment do, include any one or more or all of the preferred and optional features of the technology described herein that are described herein, as appropriate. Thus, for example, in an embodiment the modified set of data generation process processes sub-sections of the set of data at a time, and no existing data is loaded from the output buffer before the modification operation starts (then as the modified set of data is generated, parts of the data that will be modified are identified, and existing data loaded from the output buffer for the modification operation on the basis of the parts of the data that have been identified as to be modified).

Similarly, in an embodiment the process further comprises determining whether to write data for the modified set of data back to the output buffer in the manner discussed above in relation to the overlaid image rendering. Thus, in an embodiment of these arrangements of the technology described herein, it is further determined whether there are any parts of the existing set of data that have not been modified when modifying the existing set of data to generate the modified set of data; and, for any parts of the existing set of data that have been determined to have not been modified when modifying the existing set of data to generate the modified set of data, data for those unmodified parts of the existing set of data is not written to the output buffer, and the existing data for those parts of the existing set of data is left unchanged in the output buffer.

In an embodiment, meta-data is used, as discussed above, to indicate the "modified" status of the data, and/or the data processor is one of a graphics processor, a CPU, and a DSP, etc.

The data processing system in an embodiment stores the data in the output buffer by writing blocks of data representing particular parts of an output array of data to the output buffer. In these arrangements, the data blocks may, e.g., be, and in an embodiment are, rendered tiles produced by a tile-based graphics processing system (a graphics processor), video data blocks produced by a video processing system (a video processor), composite frame tiles produced by a composition processing system, image blocks produced by a camera sensor, data blocks produced by a CPU, etc.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

The technology described herein is applicable to any suitable form or configuration of tile-based graphics processor and renderer, such as processors having a "pipelined" rendering arrangement (in which case the renderer will be in the form of a rendering pipeline).

As will be appreciated from the above, the technology described herein is particularly, although not exclusively, applicable to 2D and 3D graphics processors and processing devices, and accordingly extends to a 2D and/or 3D graphics processor and a 2D and/or 3D graphics processing platform including the apparatus of, or operated in accordance with the method of, any one or more of the embodiments of the technology described herein that are described herein. Subject to any hardware necessary to carry out the specific functions discussed above, such a 2D and/or 3D graphics processor can otherwise include any one or more or all of the usual functional units, etc., that 2D and/or 3D graphics processors include.

It will also be appreciated by those skilled in the art that all of the described arrangements and embodiments of the technology described herein can include, as appropriate, any one or more or all of the preferred and optional features described herein.

The methods in accordance with the technology described herein may be implemented at least partially using software e.g. computer programs. It will thus be seen that further embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described herein need be carried out by computer software and thus a further embodiment of the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described. These embodiments will be described primarily with reference to the use of the technology described herein in a tile-based graphics processing system, although, as noted above, the technology described herein is applicable to other graphics processing systems and to other data processing systems which perform read-modify-write operations on data in main memory.

FIG. 1 shows schematically an arrangement of a graphics processing system that can be operated in accordance with the technology described herein.

The graphics processing system includes, as shown in FIG. 1, a tile-based graphics processor or graphics processing unit (GPU) 1, which, as is known in the art, produces tiles of an image (an output data array), such as an output frame to be generated. The output image (data array) may, as is known in the art, typically be an output frame intended for display on a display device, such as a screen or printer, but may also, for example, comprise a "render to texture" output of the graphics processor, etc.

The graphics processor 1 includes a set of tile buffers 5 which serve as a fast local memory for the graphics processor 1.

As is known in the art, in such an arrangement, once a tile has been generated by the graphics processor 1, it is then written from the tile buffers 5 to a frame buffer 6 in main memory 2 (which memory may be DDR-SDRAM) via an interconnect 3 which is connected to a memory controller 4. The data from the tile buffers may be downsampled before it is written to the frame buffer, if desired. Sometime later the frame buffer will, e.g., be read by a display controller and output to a display.

As discussed above, the technology described herein relates in particular to the rendering of an overlay to some existing image.

Figure 2:
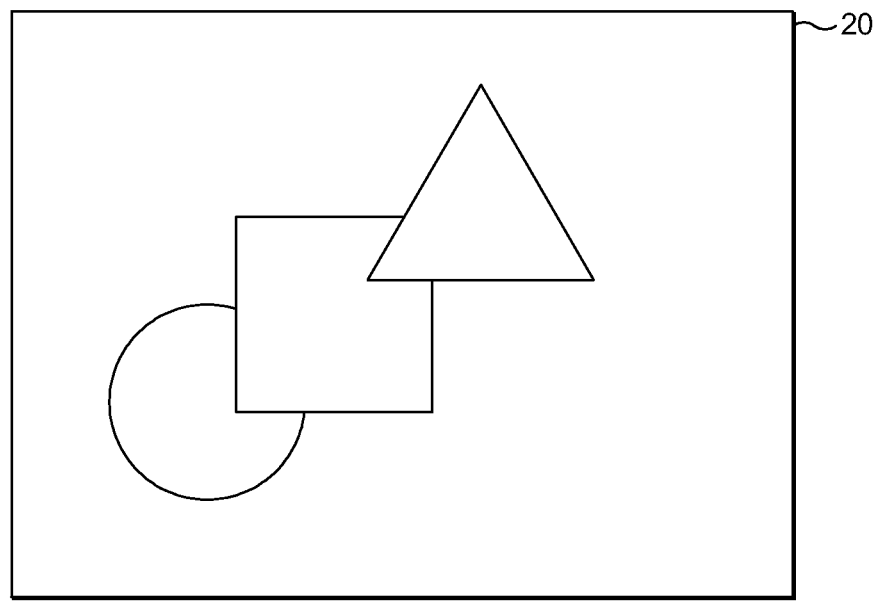
FIG. 2 illustrates the overlay rendering process.
Figure 2:
Figure 2:
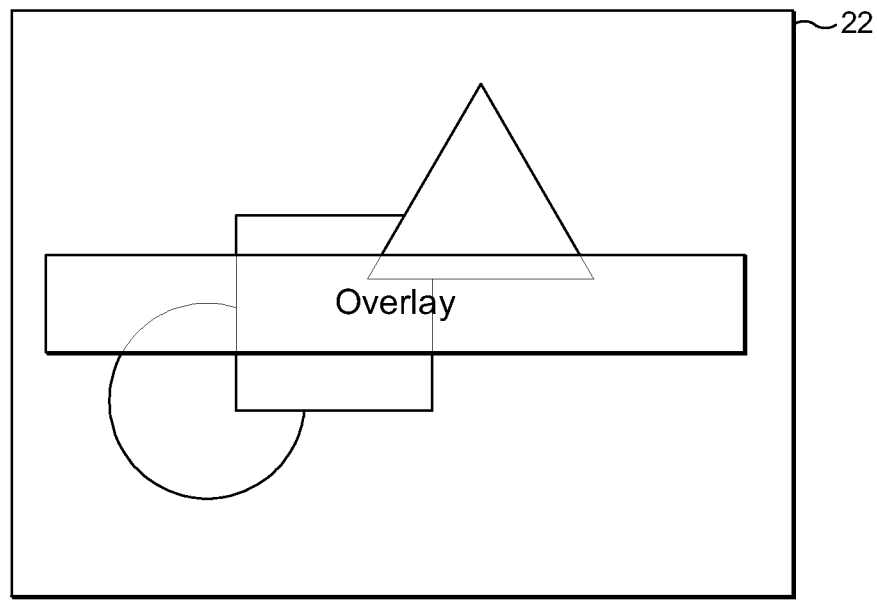

FIG. 2 illustrates this process. FIG. 2 shows schematically an exemplary existing image 20, together with a semi-transparent overlay image 21 that is to be overlaid on that image 20, and the resulting overlaid image 22.

In a known technique for generating the overlaid image 22 illustrated in FIG. 2, the existing image 20 to which the overlay is to be applied will already be stored in the frame buffer 6 in main memory 2. Then, for each tile of the existing image 20 to which the overlay image 21 is to be applied, the graphics processor 1 will load the existing data for the tile from the frame buffer 6 in the main memory 2 into the local, tile, buffer 5 of the graphics processor 1. Then, the graphics processor 1 will render the overlay image 21 for the tile in question, and apply that rendered overlay image to the existing tile data in the tile buffer 5 appropriately. Once this process has been completed, the modified tile data is then written back to the frame buffer 6 in the main memory 2. This is repeated for each tile making up the output frame (image), and once all the tiles have been modified in this way, the modified output frame, showing the overlay, will be present in the frame buffer 6 and can then be displayed.

Figure 3:
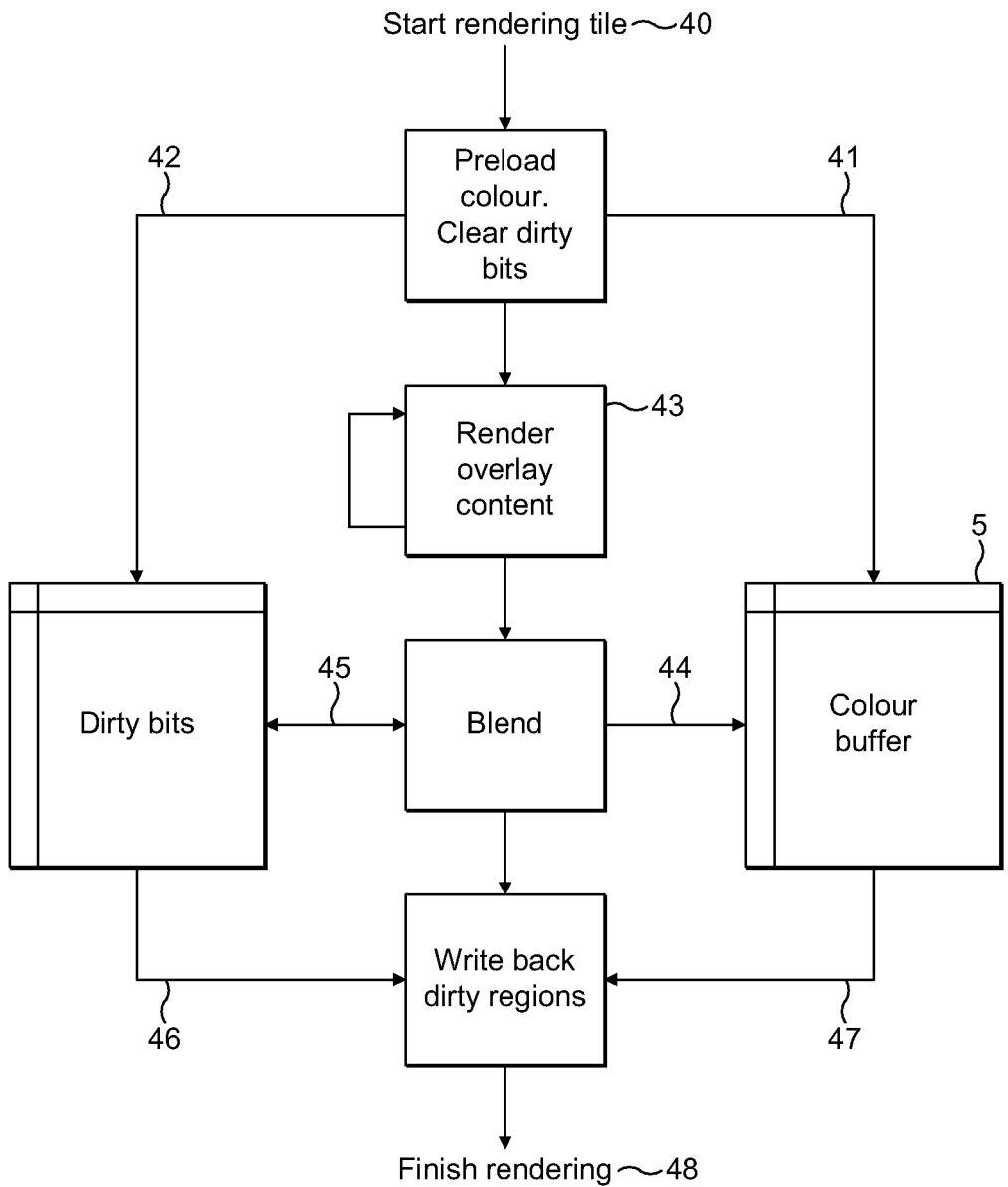
FIG. 3 shows schematically a first embodiment of the technology described herein.
Figure 4:
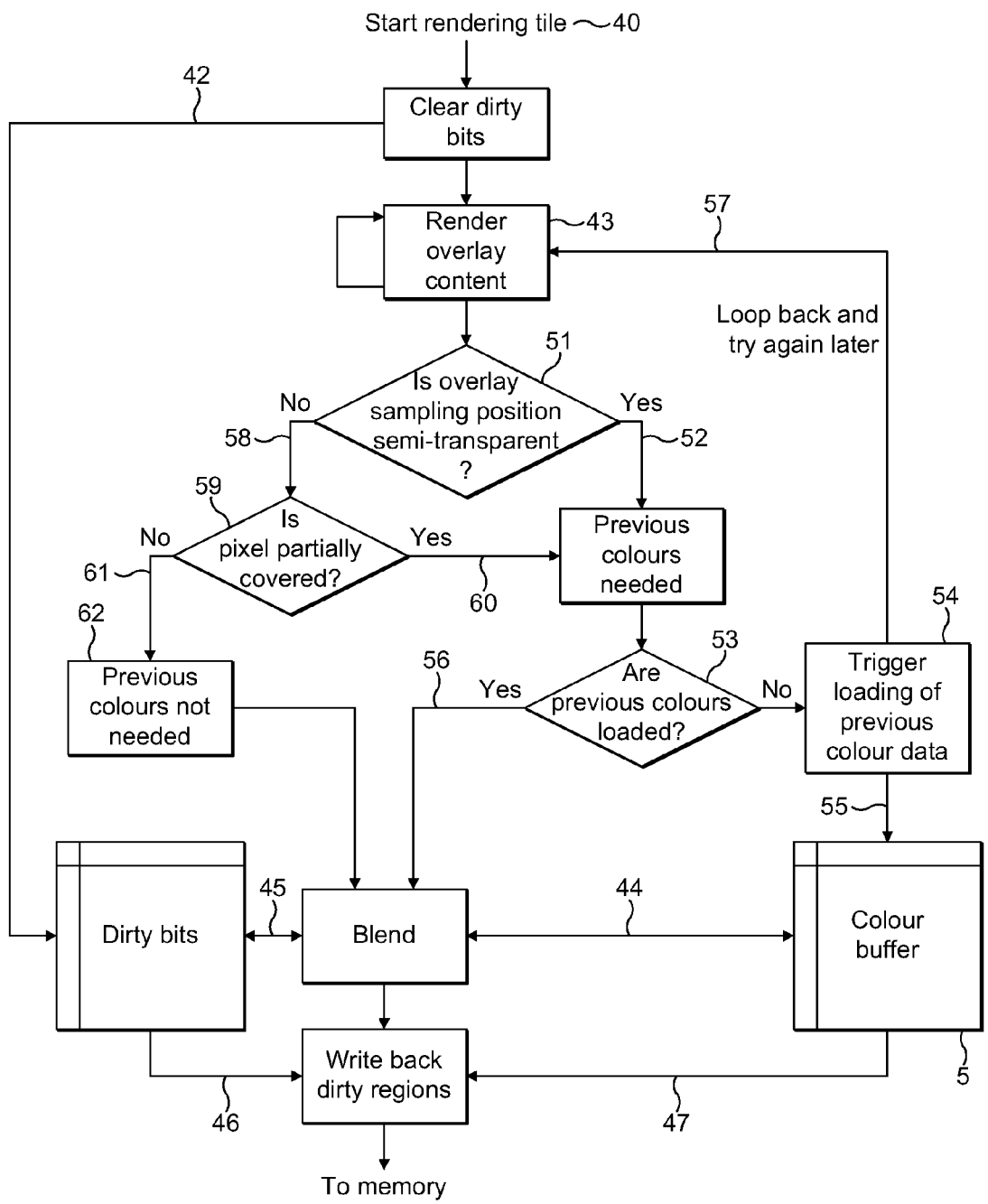
FIG. 4 shows schematically another embodiment of the technology described herein.

As discussed above, in the technology described herein this process is modified to reduce the number of reading and writing operations that are required for the overlaid image generation process. Two embodiments of the technology described herein that achieve this will now be described with reference to FIGS. 3 and 4. FIG. 3 shows a first embodiment in which the writing back of tile data to the frame buffer is controlled to reduce the amount of data that needs to be written back to the frame buffer for a modified (overlaid) tile. FIG. 4 shows an embodiment in which both the reading of the existing tile data into the tile buffer for the overlay rendering process, and the writing back of the tile data to the frame buffer for the overlay rendering process, are modified.

Both of these embodiments of the technology described herein use meta-data, in the form of "dirty" ("modified") bits, to indicate whether given regions of a tile to which an overlay image is being applied have been modified by the overlay image or not. This meta-data is then used, in particular, to control the writing back of the tile data to the output frame (image) in the main memory. In the present embodiment, each 2×2 group of sampling positions (i.e. 2×2 region of sampling positions in the tile) has associated with it a corresponding dirty bit that can be set to indicate whether any of the data for that 2×2 sampling position region of the tile has been modified by the overlay rendering process or not. (The present embodiment uses 2×2 sampling position regions of the tiles because when using 4× downsampling on the data for the tile when displaying the tile, each 2×2 sampling position region of the tile will accordingly represent a single pixel in the displayed output (in the output frame). Other arrangements, such as using other tile region sizes corresponding to each dirty bit in the meta-data, may, of course, be used.)

The meta-data (dirty bits) for a tile may be arranged as desired. In the present embodiments, it is arranged as a simple linear dirty bit array, with each bit corresponding to a respective set of 2×2 sampling positions. The meta-data bits can all be read and written individually, and can all be cleared at once. Other arrangements, such as using a 2D array, hierarchical structures, etc., would be possible if desired.

FIG. 3 shows a first embodiment of the technology described herein, and illustrates the processing that is carried out in respect of a single tile of the output frame (image) when an overlay is to be rendered to an existing image in the embodiment. The process shown in FIG. 3 is accordingly repeated for each appropriate tile of the output frame, so as to provide an overall output frame comprising the overlaid image.

As shown in FIG. 3, in this embodiment the first stage in the process when an overlaid image is to be rendered to an existing image, is to, when a respective tile of the image is to be rendered (step 40), preload the existing tile data for the existing image from the frame buffer in the main memory into the local colour buffer in the tile buffer 5 of the graphics processor (step 41). At this stage, the relevant dirty bits (modification meta-data) for the tile are also cleared (i.e. set to indicate that the corresponding regions of the tile are as yet unmodified by the overlay image) (step 42).

In the present embodiments, the dirty bits (meta-data) is stored in the tile buffer together with the tile data itself. Thus, in the present embodiments, the tile buffer comprises a 256×128 bit array for colour data (representing 16×16 frame buffer pixel positions, each having 4 R8G8B8A8 sample values) and an associated 256×1 bit meta-data (dirty bit) array. (Other arrangements would, of course, be possible.)

Once the tile data has been preloaded and the meta-data (dirty bits) has been cleared, the graphics processor then proceeds to render the overlay content (image) for the tile in question in the normal manner (step 43). This rendered overlay content is then used, where necessary, and as appropriate, to modify (update) the tile data stored in the colour buffer (step 44). This modification process can include, for example, and as will be understood by those skilled in the art, overwriting the existing tile data with the new rendered content from the overlay image (e.g. where the overlay image is opaque and simply overwrites the existing image), or appropriately blending the existing tile data with the rendered overlay data (where, for example, the overlay is semi-transparent and/or affects a partially covered pixel).

When the data for a given sampling position stored in the tile buffer is modified as a result of the overlaid image, the corresponding dirty bit in the meta-data array for the tile region that the sampling position falls within is set (updated) to indicate that data for that tile region has been modified (changed) (step 45).

Then, when all the rendering for the tile has been completed, the dirty bits (meta-data) are examined to determine which regions of the tile have been modified (step 46). Any regions of the tile indicated as having been modified by the rendering process are then written back to the output image in the frame buffer in the main memory (step 47) (their data is written back to the frame buffer). However, any regions whose dirty bits (meta-data) have not been set (i.e. do not indicate that the data for that region has been modified), are not written back to the frame buffer in the main memory. In this way, the writing back of (data for) unmodified regions of the tile to the frame buffer in main memory following the overlay image rendering is avoided, thereby saving on the number of write operations required to write the overlaid image into the frame buffer.

In this embodiment, the tile data writeback process (for writing back the modified tile regions) is tailored for, and takes account of, the particular output buffer (e.g. main memory) write mechanisms and processes that the graphics processing system uses and/or supports.

In the present embodiment, data is written to the frame buffer in main memory in several bursts, with each burst containing several data "transfers". For example, considering a 16×16 sampling position tile, with 16 bits of data per sampling position, this gives a total of 16×16×16=4096 bits of information for writing the tile to main memory. If the graphics processor is coupled to a 64-bit memory bus with a maximum burst length of 8 transfers per burst, then to write out the whole tile data would require 4096/64=64 transfers, organized optimally as 8 bursts of 8 transfers each.

In the present embodiment, if none of the data in a burst has been modified, then the burst as a whole is omitted. This saves time and bus bandwidth. Similarly, if whole transfers at the beginning or end of a burst are unmodified, then these transfers are omitted and a shorter burst created that covers only the modified data transfers. This also saves time and bus bandwidth.

Where transfers within a burst, or only part of the data within a transfer, are modified, then the data strobe lines are activated individually for each transfer, disabling writing of parts of the data. In the above example, where there would be four 16-bit sampling positions in each 64-bit transfer, then for a transfer where half the sampling positions are modified, then only half the write strobe signals would be asserted for that transfer. The data pins associated with the de-asserted strobes are not actively driven, and can either remain at their previous values or be switched into a high-impedance state. Although this does not in itself save time or bus bandwidth, it may save power (depending on the memory system design) by not having to drive the de-asserted data pins.

Once the processing and writing back of the data for the tile in question is completed (step 48), the graphics processor 1 can then move on to the next tile (if any), and so on, until the complete overlaid image (output array) has been generated and stored in the frame buffer (main memory). The overlaid image can then be displayed, etc.

FIG. 4 shows a second embodiment of the technology described herein. In this embodiment, the writing back of the modified tile data to the frame buffer in main memory is controlled using meta-data in the same manner as discussed above in relation to FIG. 3. However, in this embodiment the loading of the existing tile data into the local tile buffer of the graphics processor 1 is not done at the start of rendering as in the first embodiment shown in FIG. 3, but instead the loading of the existing tile data from the frame buffer in main memory is deferred until it is determined that that data is or could be actually needed for the overlay rendering process.

Thus, as shown in FIG. 4, the initial step, once the rendering of a tile to be overlaid is started (step 40), is simply to clear the meta-data (dirty bits) for the tile (step 42), thereby indicating that every region of the tile at that point is unchanged (clean). In contrast to the embodiment shown in FIG. 3, the existing data for the tile is not loaded into the tile buffer 5 from the frame buffer at this stage, and the tile buffer data is therefore in an undefined state.

Then, as in the case of the embodiment shown in FIG. 3, the graphics processor proceeds to render the overlay image (step 43).

Once the overlay image has been rendered, it is then determined whether data for the existing tile is needed in order to provide the overlaid, output tile. In particular, the Applicants have recognised that even if new data for a sampling position is generated for the overlay image, it is not inevitably the case that the final overlaid data for that sampling position will depend upon the existing sampling position value in the existing image. For example, if the new sampling position value for the overlay image is opaque and therefore simply overwrites the existing sampling position data, the modified sampling position data following the overlay process will not depend upon the existing data for that sampling position. On the other hand, if the new sampling position data is semi-transparent, or lies at an edge of an anti-aliased triangle, for example, then the final value of the data for that sampling position in the overlaid tile will depend on the existing (original) tile data for that sampling position in the existing image that is to be overlaid. In that case therefore, the existing tile data for the sampling position in question must be read from the frame buffer in main memory before the overlaid sampling position value can be calculated.

The embodiment shown in FIG. 4 accordingly tests whether the existing tile data in the frame buffer in main memory is actually needed in order to generate the final overlaid tile data, and if so, then loads the existing tile data for use in the modification process. On the other hand, if the existing tile data is not needed for the modification process, then the new tile data is simply written directly to the tile buffer without loading any existing tile data.

This is achieved, as shown in FIG. 4, by, once the overlay image data for the tile has been rendered (step 43), first determining in respect of each respective sampling position value for the overlay image, whether that sampling position value is semi-transparent (indicates semi-transparency) or not (step 51). (As will be appreciated by those skilled in the art, this process can consider individual sampling positions in the tile, or groups of sampling positions collectively, e.g. depending upon whether each fragment that is rendered by the graphics processor represents a single sampling position or a set of plural sampling positions. Also, fully transparent overlay sampling positions can be ignored, as they will not have any effect on the overlaid image.)

If a sampling position value for the overlay image indicates semi-transparency, then, as discussed above, the existing data for that sampling position stored in the frame buffer will be required (step 52), and so a determination is then made as to whether that existing tile data has already been loaded into the tile buffer (step 53). If the existing tile data is not already loaded in the tile buffer, the loading of the existing tile data for the sampling position in question is triggered (step 54), and the existing tile data is loaded into the tile buffer (step 55). (As shown in FIG. 4, if necessary the system can loop back and try again later (step 57), e.g., where there will be a delay between triggering the loading of the existing tile data and that data being actually loaded into the tile buffer for the modification process. Additional meta-data could be used to keep track of which existing tile data has been loaded into the tile buffer, if desired.)

Once the existing tile data is loaded into the tile buffer 5 (or if it is found to already be there at step 53), the modified value for the tile sampling position in question is then determined using the existing tile data and the newly rendered overlay tile data appropriately, and stored in the tile buffer (steps 56 and 44).

If the overlay sample position value is found to be opaque (not transparent) (step 58), then it is further tested whether the sampling position in question relates to a partially covered pixel or not (e.g. could lie at an edge of an anti-aliased triangle or not) (step 59).

If it is determined that the sampling position in question relates to a partially covered pixel (i.e. lies at an edge of an anti-aliased triangle), then again, as discussed above, the existing tile data will be needed to generate the final modified sampling position values (step 60), and so again the process proceeds to determine whether the existing tile data has already been loaded, and to, if necessary, trigger the loading of the existing tile data, before then using the existing tile data to generate the final, modified tile data for the sampling position(s) in question (steps 53, 54, 55, 56 and 44).

On the other hand, if it is found at step 59 that the opaque sampling position value does not relate to a partially covered pixel (step 61), then the overlaid tile data value for that sampling position will not depend on the existing tile data for that sampling position, and so the system determines that the existing tile data is not needed in order to generate the overlaid tile data for the sampling position(s) in question (step 62). In this case, the new tile data value for the sampling position(s) in question can immediately be written to the tile buffer (step 44).

As in the embodiment of the technology described herein described in FIG. 3, in this embodiment any tile regions for which a sampling position's data value is modified in the tile buffer 5 has its meta-data (dirty bit) set accordingly (step 45), and then the data is written back in the manner discussed in relation to FIG. 3 on the basis of the meta-data (dirty bit) settings for the respective tile regions (steps 46 and 47).

Thus, in this embodiment, writing data back to the frame buffer in main memory proceeds as for the other embodiment, namely on the basis of whether or not the relevant meta-data (dirty bit) for the tile regions has been set or not. The fact that some sampling position values in the tile buffer 5 may still be undefined in this embodiment (as they have not been loaded from the existing tile in the frame buffer, nor had a new value generated for them by the overlay rendering) will not be a problem, since that will only ever be the case for tile regions that will not be written back to the main memory in any event.

It can be seen that in this embodiment, it is determined whether a new sampling position value depends upon the previous sampling position value in the existing output frame or not. If it does not, then the new sampling position value is simply written directly to the tile buffer and the meta-data is set. However, if the new value for the sampling position does depend on the existing value for that sampling position, then the existing tile data is read from the frame buffer in the main memory before the new sampling position value is calculated.

Thus, in this embodiment, the system essentially operates as follows: if the sampling position data in the overlaid image depends on both the original, existing image data and the overlay data, then the existing image data is read into the local memory of the graphics processor and the modified data after the overlay process is written back to the output buffer; if the sampling position data in the overlaid image depends on the existing image data but does not depend on the overlay image data, then the existing image data is not read into the local buffer of the graphics processor, and there is no resulting data value written to the output buffer after the overlay process; and if the sampling position data in the overlaid image does not depend on the existing image data, but does depend on the overlay image data, then the existing image data is not read into the local buffer of the graphics processor, but the resulting data following the modification process is written back to the output buffer.

In this embodiment, where it is determined that data for a region of the existing tile will need to be loaded for the modification operation, then the system can simply load the data for the tile region in question and nothing else. However, the Applicants have recognised that, e.g. depending on the details of the memory system, it may be more efficient to load more data than is definitely required at one time (e.g. to fetch multiple regions of data at one time), and thus in this embodiment, this can also be done, if desired. For example, it may be more efficient to fetch data in bursts, and any additional overhead for loading additional data may be lower than if separate requests were used for each tile region. Also, if semi-transparent rendering is being used, adjacent tile regions are likely to be treated similarly, so loading more existing tile data can usefully act as a speculative fetch for existing tile data that is likely to be required soon in any event.

Also, where it is known, e.g., that tile data has been modified and the existing tile data is not required, then the tile existing data loading (reading) operation is modified, as discussed above in relation to the tile writeback operation, to modify the burst length and/or strobe bits, appropriately (and where possible), to take account of this. (In this case, the strobe signals should be asserted for the unmodified tile regions, not the modified ("dirty") ones.)

In the above arrangement, the meta-data (dirty bits) are used to indicate whether the data in the tile buffer has been modified by the overlay rendering process or not.

An alternative arrangement would be to use the meta-data (dirty bits) to instead indicate whether the sampling position(s) value(s) for a region in the tile buffer is defined or not. In other words, a "clear" dirty bit will indicate that the region's value(s) is undefined, whereas a "set" dirty bit will indicate that the tile region's value(s) has been defined. In this case, as soon as existing tile data is loaded from the frame buffer in main memory to the tile buffer, the dirty bit will be set to show that the corresponding tile regions now have their values defined. This would mean that any existing tile data that is speculatively loaded will be marked in the meta-data as being defined, and so will be written back to the frame buffer even if in fact that speculatively loaded existing tile data is not modified as part of the overlay rendering process. This could potentially lead to a higher write back rate, but the Applicants believe that this will be outweighed by the other advantages of the technology described herein in any event.

The above embodiment is particularly advantageous, because in typical overlaid scenes, large areas will either be opaque objects, and therefore not require loading of the existing tile data, or untouched transparent areas, thereby eliminating both read and write back of the tile data. Thus this embodiment can eliminate the majority of the read accesses and a good proportion of the write back operations in typical overlaid content.

In the above embodiments, and in the technology described herein, the existing image that is to have the overlay laid on it, may be, and indeed typically could be, an image that has been previously generated by the graphics processor 1. However, it could also be an image that has been generated in some other way, for example a video frame that has been generated by a separate dedicated video decoder. This could be the case, where, for example, the overlay is to show media player controls on top of a video generated by a separate video decoder.

Equally, although again it could be, and, indeed, typically may be, the case that the overlay image will be rendered by the graphics processor 1 "on the fly" using normal GPU operation (as is shown in FIGS. 3 and 4), it would also be possible for the overlay image to instead (or also, at least in part) have been pre-generated and provided to the graphics processor 1 in an appropriate form (e.g. by storing it in memory accessible to the graphics processor). In this case, the rendering operation would perform the overlay operation, but not in itself generate (at least part of) the overlay image. This could be the case, e.g., for a channel overlay to be shown on a TV channel, for example.

Also, although in the above embodiments it is the graphics processor itself that sets the modification meta-data (e.g. dirty bits), determines whether to write the data back to the output buffer after the modification process, determines whether to load the data from the output buffer for the modification process, etc., it would be possible instead to have a separate device that, e.g., sits on the bus between the graphics processor 1 and the external memory 2 where the output buffer is stored, which could perform these processes (e.g. detect and filter out unmodified data and determine whether or not to load data from the external memory).

In the above embodiments, the overlay process is carried out on tiles of an image at a time. Thus tile data is loaded into the local buffer of the graphics processor, some or all of that tile data is then modified by the overlay content, and then that tile data is written back to the output buffer as appropriate, with meta-data representing different regions of a tile being used to control the process.

However, other arrangements would be possible, such as taking the image as a whole (where, e.g., the local buffers of the graphics processor can store the entire image), rather than treating each tile of the image individually, or, indeed, using other sub-divisions of the overall image, such as taking sets of plural tiles of the image at a time (e.g. again depending upon whether the graphics processing system can handle such image sub-divisions or not).

Also, although the technology described herein has been described above with particular reference to the rendering of overlaid images in graphics processing systems, as discussed above, techniques of the technology described herein can be used advantageously in other systems that use a local fast memory buffer to perform read-modify-write operations on data that has been previously stored in main memory.

It can be seen from the above that the technology described herein, in its described embodiments at least, can reduce the main memory bandwidth, etc., consumed when rendering overlaid images, in particular in tile-based graphics processing systems. The technology described herein accordingly can provide, for example, better speed and a power advantage over other tile-based renderers. It can be used advantageously for any tile-based renderer or application that utilises a local fast memory buffer to implement read-modify-write operations on data in a buffer in main memory.

This is achieved, in the embodiments of the technology described herein at least, by reducing the number of writes required to writeback overlaid images (modified data) to main memory, and in embodiments, by also reducing the number of reads required to preload a local buffer with data for the overlay (modification) process.

In embodiments of the technology described herein, this is achieved by using meta-data, such as dirty bits, to determine whether data needs to be written back to main memory or not, and, in embodiments, by also, before reading any existing data into the local memory, determining whether that existing data is in fact required for the overlay (modification) process or not.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method of operating a graphics processing system when an overlay image is to be overlaid on an existing image for which data is already stored in an output array of data in an output buffer, the method comprising:
   reading data for the existing image from the output array of data in the output buffer;
   using data for the overlay image to modify data for the existing image to generate an overlaid image showing the overlay image overlaid on the existing image; and
   writing data for the overlaid image back to the output array of data in the output buffer, wherein:
   the step of writing data for the overlaid image back to the output array of data in the output buffer comprises:
   determining whether there are any regions of the existing image that have not been modified when modifying the data for the existing image to generate the overlaid image; and
   for any regions of the existing image that have been determined to have not been modified when modifying the data for the existing image to generate the overlaid image, not writing data for the overlaid image for those unmodified regions of the existing image back to the output array of data in the output buffer, and using the data for those regions of the existing image that is already stored in the output data array in the output buffer for the overlaid image; and
   the method further comprises:
   as the overlaid image is rendered, loading any existing image data in the output data array that is needed for the overlay rendering process back into a local memory of the graphics processing system from the output buffer for modification using data for the overlay image to show the overlay image overlaid on the existing image;
   wherein:
   the step of loading existing image data in the output data array that is needed for the overlay rendering process back into a local memory of the graphics processing system from the output buffer for modification using data for the overlay image to show the overlay image overlaid on the existing image comprises:
   identifying regions of the existing image that will be modified using data for the overlay image as the overlaid image is rendered; and
   when a region of the image has been identified as a region of the existing image that will be modified using data for the overlay image as the overlaid image is rendered, determining whether the existing image data is needed for the modification process, and then only loading the existing image data in that event.

2. The method of claim 1, further comprising:
   generating data for the overlay image.

3. The method of claim 1, comprising:
   recording in meta-data associated with the image those regions of the image that have been modified when modifying the data for the existing image to generate the overlaid image; and
   using the meta-data to determine for at least one region of the image, whether to write new data for the region of the overlaid image back to the output array of data in the output buffer, or to use the data for the region of the existing image that is already stored in the output data array in the output buffer for the overlaid image.

4. The method of claim 1, wherein:
   the step of loading existing image data in the output data array that is needed for the overlay rendering process back into a local memory of the graphics processing system from the output buffer for modification using data for the overlay image to show the overlay image overlaid on the existing image comprises:
   identifying regions of the existing image that will be modified using data for the overlay image as the overlaid image is rendered; and
   selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered.

5. The method of claim 1, wherein the graphics processing system is a tile-based graphics processing system, and the image is processed by modifying individual rendering tiles for the image in turn.

6. A method of operating a graphics processing system when an overlay image is to be overlaid on an existing image for which data is already stored in an output array of data in an output buffer, the method comprising:
   as the overlaid image is rendered, loading any existing image data in the output data array that is needed for the overlay rendering process back into a local memory of the graphics processing system from the output buffer for modification using data for the overlay image to show the overlay image overlaid on the existing image; and writing the modified data showing the overlaid image back to the output array of data in the output data array; wherein:

the step of loading existing image data in the output data array that is needed for the overlay rendering process back into a local memory of the graphics processing system from the output buffer for modification using data for the overlay image to show the overlay image overlaid on the existing image comprises:

identifying regions of the existing image that will be modified using data for the overlay image as the overlaid image is rendered;

selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered; and when a region of the image has been identified as a region of the existing image that will be modified using data for the overlay image as the overlaid image is rendered, determining whether the existing image data is needed for the modification process, and then only loading the existing image data in that event.

7. A graphics processing system comprising:
a graphics processor; and
an output buffer for storing output arrays of data generated by or for use by the graphics processor; and wherein:
the graphics processing system is configured to:
when an overlay image is to be overlaid on an existing image for which data is already stored in an output array of data in the output buffer:
read data for the existing image from the output array of data in the output buffer;
use data for the overlay image to modify data for the existing image to generate an overlaid image showing the overlay image overlaid on the existing image; and
write data for the overlaid image back to the output array of data in the output buffer;
wherein the graphics processing system is configured to:
write data for the overlaid image back to the output array of data in the output buffer by:
determining whether there are any regions of the existing image that have not been modified when modifying the data for the existing image to generate the overlaid image; and
for any regions of the existing image that have been determined to have not been modified when modifying the data for the existing image to generate the overlaid image, not writing data for the overlaid image for those unmodified regions of the existing image back to the output array of data in the output buffer, and using the data for those regions of the existing image that is already stored in the output data array in the output buffer for the overlaid image;
and the graphics processing system is further configured to:
as the overlaid image is rendered, load any existing image data in the output data array that is needed for the overlay rendering process back into a local memory of the graphics processing system from the output buffer for modification using data for the overlay image to show the overlay image overlaid on the existing image; wherein:

the graphics processing system is further configured such that the process of loading existing image data in the output data array that is needed for the overlay rendering process back into a local memory of the graphics processing system from the output buffer for modification using data for the overlay image to show the overlay image overlaid on the existing image comprises:

identifying regions of the existing image that will be modified using data for the overlay image as the overlaid image is rendered; and when a region of the image has been identified as being a region of the existing image that will be modified using data for the overlay image as the overlaid image is rendered, determining whether the existing image data is needed for the modification process, and then only loading the existing image data in that event.

8. The system of claim 7, wherein the graphics processing system is further configured to generate data for the overlay image.

9. The system of claim 7, wherein the graphics processing system is further configured to:
record in meta-data associated with the image those regions of the image that have been modified when modifying the data for the existing image to generate the overlaid image; and
use the meta-data to determine for at least one region of the image, whether to write new data for the region of the overlaid image to the output array of data in the output buffer, or to use the data for the region of the existing image that is already stored in the output data array in the output buffer for the overlaid image.

10. The system of claim 7, wherein the graphics processing system is further configured such that the process of loading existing image data in the output data array that is needed for the overlay rendering process back into a local memory of the graphics processing system from the output buffer for modification using data for the overlay image to show the overlay image overlaid on the existing image comprises:

identifying regions of the existing image that will be modified using data for the overlay image as the overlaid image is rendered; and selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered.

11. The system of claim 7, wherein the graphics processing system is a tile-based graphics processing system, and wherein the graphics processing system is further configured to process the image by modifying individual rendering tiles for the image in turn.

12. The system of claim 7, wherein the output buffer is a frame buffer to which the output of the graphics processing system is to be written.

13. A graphics processing system comprising:
a graphics processor;
a local memory of or available to the graphics processor; and
an output buffer for storing output arrays of data generated by or for use by the graphics processor; and wherein:

the graphics processing system is configured to:
when an overlay image is to be overlaid on an existing image for which data is already stored in an output array of data in the output buffer:
as the overlaid image is rendered, load any existing image data in the output data array that is needed for the overlay rendering process back into the local memory of or available to the graphics processor from the output buffer for modification using data for the overlay image to show the overlay image overlaid on the existing image; and
write the modified data showing the overlaid image back to the output array of data in the output data array; wherein:
the graphics processing system is further configured such that the process of loading existing image data in the output data array that is needed for the overlay rendering process back into the local memory of or available to the graphics processor from the output buffer for modification using data for the overlay image to show the overlay image overlaid on the existing image comprises:
identifying regions of the existing image that will be modified using data for the overlay image as the overlaid image is rendered;
selecting the existing image data that is loaded from the output buffer into the local memory of the graphics processing system for the overlaid image rendering process on the basis of the regions of the existing image that have been identified as being regions of the existing image that will be modified using data for the overlay image as the overlaid image is rendered; and
when a region of the image has been identified as being a region of the existing image that will be modified using data for the overlay image as the overlaid image is rendered, determining whether the existing image data is needed for the modification process, and then only loading the existing image data in that event.

14. A data processing system comprising:
a data processor;
a local memory for the data processor; and
an output buffer for storing output sets of data; and wherein:
the data processing system is configured to, when new data is to be used to modify an existing set of data which is already stored in the output buffer to generate a modified set of data:
as the modified set of data is generated, load any existing data in the output buffer that is needed to generate the modified set of data into the local memory for the data processing system from the output buffer for modification using the new data to generate the modified set of data; and
write the modified data back to the output buffer; wherein:
the data processing system is further configured such that the process of loading existing data in the output buffer that is needed to generate the modified set into the local memory for the data processing system from the output buffer for modification using the new data to generate the modified set of data comprises:
identifying parts of the existing set of data that will be modified using the new data as the modified set of data is generated;
selecting the existing data that is loaded from the output buffer into the local memory for the data processing system for generating the modified set of data on the basis of the parts of the existing set of data that have been identified as being parts of the existing set of data that will be modified using the new data as the modified set of data is generated; and
when a part of the existing set of data has been identified as being a part of the existing set of data that will be modified using the new data as the modified set of data is generated, determining whether the data of the existing set of data is needed for the modification process, and then only loading the data of the existing set of data in that event.

15. A non-transitory computer readable storage medium storing computer software code which when executing on a processor performs a method of operating a graphics processing system when an overlay image is to be overlaid on an existing image for which data is already stored in an output array of data in an output buffer, the method comprising:
reading data for the existing image from the output array of data in the output buffer;
using data for the overlay image to modify data for the existing image to generate an overlaid image showing the overlay image overlaid on the existing image; and
writing data for the overlaid image back to the output array of data in the output buffer, wherein:
the step of writing data for the overlaid image back to the output array of data in the output buffer comprises:
determining whether there are any regions of the existing image that have not been modified when modifying the data for the existing image to generate the overlaid image; and
for any regions of the existing image that have been determined to have not been modified when modifying the data for the existing image to generate the overlaid image, not writing data for the overlaid image for those unmodified regions of the existing image back to the output array of data in the output buffer, and using the data for those regions of the existing image that is already stored in the output data array in the output buffer for the overlaid image; and
the method further comprises:
as the overlaid image is rendered, loading any existing image data in the output data array that is needed for the overlay rendering process back into a local memory of the graphics processing system from the output buffer for modification using data for the overlay image to show the overlay image overlaid on the existing image; wherein:
the step of loading existing image data in the output data array that is needed for the overlay rendering process back into a local memory of the graphics processing system from the output buffer for modification using data for the overlay image to show the overlay image overlaid on the existing image comprises:
identifying regions of the existing image that will be modified using data for the overlay image as the overlaid image is rendered; and
when a region of the image has been identified as a region of the existing image that will be modified using data for the overlay image as the overlaid image is rendered, determining whether the existing image data is needed for the modification process, and then only loading the existing image data in that event.

16. A non-transitory computer readable storage medium storing computer software code which when executing on a processor performs a method of operating a data processing system when new data is to be used to modify an existing set of data which is already stored in an output buffer, to generate a modified set of data, the method comprising:
- as the modified set of data is generated, loading any existing data in the output buffer that is needed to generate the modified set of data into a local memory for the data processing system from the output buffer for modification using the new data to generate the modified set of data; and
- writing the modified data back to the output buffer; wherein:
- the step of loading existing data in the output buffer that is needed to generate the modified set of data into the local memory for the data processing system from the output buffer for modification using the new data to generate the modified set of data comprises:
- identifying parts of the existing set of data that will be modified using the new data as the modified set of data is generated;
- selecting the existing data that is loaded from the output buffer into the local memory for the data processing system for generating the modified set of data on the basis of the parts of the existing set of data that have been identified as being parts of the existing set of data that will be modified using the new data as the modified set of data is generated; and
- when a part of the existing set of data has been identified as being a part of the existing set of data that will be modified using the new data as the modified set of data is generated, determining whether the data of the existing set of data is needed for the modification process, and then only loading the data of the existing set of data in that event.

* * * * *